UNITED STATES PATENT OFFICE.

HEINRICH KERSKEN AND EUGEN BODSTEIN, OF WEHOFEN, NIEDERRHEIN, GERMANY.

METHOD OF PRODUCING MEANS FOR PREVENTING SCALES ON BOILERS, &c.

1,097,551. Specification of Letters Patent. Patented May 19, 1914.

No Drawing. Application filed January 10, 1914. Serial No. 811,306.

*To all whom it may concern:*

Be it known that we, HEINRICH KERSKEN and EUGEN BODSTEIN, both subjects of the German Emperor, and residents of Wehofen, Niederrhein, Germany, have invented a new and Improved Method of Producing Means for Preventing the Formation of Scales on Boilers, &c., of which the following is a specification.

This invention relates to improved means for preventing the formation of scales on boilers, tubes and similar articles.

By our invention the use of alkaline solutions which are very injurious to boiler fittings are entirely avoided, while furthermore a perfect emulsion is obtained, which will cover the boilers and tubes with a permanent greasy coat, any separation of free oils not taking place; finally scales that have formed prior to the application of the emulsion are readily dissolved thereby.

In carrying out our invention we proceed as follows: About 15 parts of glycerin are mixed with about 100 parts of water, and the mixture is boiled. About 8 parts of commercial oleic acid are mixed with about 20 parts of mineral oil (petroleum) and the mixture is well stirred, so that the two oils are intimately combined. The two mixtures are now stirred together and vaporized, so as to leave the emulsion desired.

We claim:

Method of obtaining an emulsion for preventing the formation of scales on boilers, tubes, and similar articles, which consists in preparing a first mixture of glycerin and water, boiling said first mixture, preparing a second mixture of commercial oleic acid and petroleum, combining the two mixtures, and vaporizing the combined mixtures.

In testimony whereof we hereto affix our signatures in the presence of the two subscribing witnesses.

HEINRICH KERSKEN.
EUGEN BODSTEIN.

Witnesses:
OSCAR DEPNER,
LOUIS VAN DORY.